United States Patent
Takahashi

[19]

[11] Patent Number: 5,890,685
[45] Date of Patent: Apr. 6, 1999

[54] EXHAUST-SYSTEM SUPPORT STRUCTURE

[75] Inventor: Yoichi Takahashi, Kanagawa, Japan

[73] Assignee: Calsonic Corporation, Tokyo, Japan

[21] Appl. No.: 863,328

[22] Filed: May 27, 1997

[30] Foreign Application Priority Data

May 28, 1996 [JP] Japan .................................. 8-156168

[51] Int. Cl.⁶ .................................................. F16L 3/08
[52] U.S. Cl. ........................................ 248/74.3; 248/74.1
[58] Field of Search ................................ 248/74.1, 74.3, 248/58

[56] References Cited

U.S. PATENT DOCUMENTS

| | | | |
|---|---|---|---|
| 448,359 | 3/1891 | Nichols | 248/74.1 |
| 2,641,808 | 6/1953 | Tinnerman | 248/74.3 |
| 3,253,084 | 5/1966 | Taylor | 248/74.3 |
| 4,361,304 | 11/1982 | Younger | 248/544 |
| 5,172,877 | 12/1992 | Hattori et al. | 248/74.1 |
| 5,310,158 | 5/1994 | Cassel | 248/74 |
| 5,344,108 | 9/1994 | Heath | 248/74.3 |

FOREIGN PATENT DOCUMENTS 924028  4/1963  United Kingdom .

*Primary Examiner*—Leslie A. Braun
*Assistant Examiner*—Robert Lipcsik
*Attorney, Agent, or Firm*—Foley & Lardner

[57] ABSTRACT

An exhaust-system support structure comprises an exhaust-system tubular-member mounting arm for engagement with an elastic support hanger assembly, and a support bracket having a tubular-member clamping portion for tightly holding an exhaust-system tubular member or exhaust pipe and a mounting-arm clamping portion for tightly holding the mounting arm. The arm has a flattened portion formed in a abutment portion for abutting the exhaust pipe. The mounting-arm clamping portion has a cross section such that its inner peripheral wall is contoured to be fitted to the outer periphery of the flattened portion to hold it. The arm is fixedly connected to the exhaust pipe by pressing the bottom face of the abutment portion against the outer periphery of the exhaust pipe.

6 Claims, 6 Drawing Sheets

EXHAUST-SYSTEM SUPPORT STRUCTURE

BACKGROUND OF THE INVENTION

1. Field of the Invention

The present invention relates to an exhaust-system support device, and specifically to technologies for supporting exhaust-system component parts such as exhaust tubes included in the exhaust system of an automotive engine to conduct exhaust gases from the engine into the atmosphere, and more particularly to a structure of an exhaust-system support fixedly connected to the exhaust-system component part.

2. Description of the Prior Art

The exhaust system of an automotive vehicle is designed to conduct exhaust gases from the engine mounted for instance on the front section of the vehicle body to the rear of the vehicle. The exhaust system, through which exhaust gases leave the engine cylinders, includes the exhaust manifold, exhaust pipe, catalytic converter, sub-muffler, main muffler, tailpipe and/or an intermediate pipe connecting the exhaust pipe to the associated muffler. When mounting such exhaust-system parts on the car frame or floor panel, the exhaust-system parts construct a long assembly extending from the front to rear of the car body, and are hanged on the car frame and/or floor panel by means of a plurality of exhaust mounting bracket or hanger. A typical exhaust-system support device has been disclosed in Japanese Utility-Model Provisional Publication No. 4-109414 or in Japanese Patent Provisional Publication No.4-308314. As disclosed in the Japanese Utility-Model Provisional Publication No. 4-109414 or in Japanese Patent Provisional Publication No. 4-308314, the conventional exhaust-system support device comprises a substantially cylindrical exhaust-pipe clamp with a pair of joinable, two opposing flanged ends through which the clamp is tightly fitted to the exhaust pipe by means of bolts and nuts. The conventional support device also includes an exhaust mounting bracket fixedly connected to the clamp. As is generally known, the exhaust mounting bracket is mounted on the car body (the car frame or floor panel) through an elastic support hanger assembly often called an "exhaust mounting insulator assembly" for the purpose of heat insulation and preventing unusual noises or vibrations to be transmitted to the car body. As set forth above, the prior art exhaust-system support device requires the use of bolts and nuts for tightly fitting an exhaust-pipe clamp onto the outer periphery of the exhaust pipe. This increases the number of parts of the exhaust-system support device, thus increasing manpower in control. In case of the use of bolts and nuts, there is another problem of looseness of bolts and nuts as time goes by. The exhaust system receives forces acting in various directions owing to input vibrations which may be created by the engine and then transmitted to the exhaust system. Even if the bolts and nuts are properly evenly tightened with a specified tightening torque, the bolts and nuts may be loosened each other with the lapse of time. The loosened bolts and nuts result in lowering of supporting rigidity of the substantially cylindrical exhaust-pipe clamp in both the longitudinal and circumferential directions of the exhaust pipe, and thus cause undesired rotation or displacement of the clamped section of the exhaust pipe relative to the exhaust-pipe clamp. As a result, the prior art exhaust-system support device with an exhaust-pipe clamp tightened by means of bolts and nuts, it is difficult to permanently effectively suppress undesired vibrations which may be transmitted to the exhaust system, regardless of the lapse of time. To avoid this, there have been proposed another type exhaust-system support devices as seen in FIGS. 11A and 11B, in which the exhaust-system support device is comprised of an exhaust-pipe mounting hooked portion or exhaust-pipe mounting arm 32 (see FIG. 11A) which is directly welded to the exhaust pipe 30 and adapted to be typically hanged by an elastic support hanger such as a rubber hanger, or an exhaust-pipe hanger bracket 33 (see FIG. 11B) with a hanged pin 34 which is welded to the exhaust pipe 30 and adapted to be hanged by the elastic support hanger. The exhaust-system support device shown in FIG. 11A is formed in such a manner that the hooked portion 32, being formed by way of two-step bending, is directly welded to the outer periphery of the exhaust pipe, whereas the exhaust-system support device shown in FIG. 11B is formed in such a manner that the hanger bracket 33, being comprised of a press-worked metal plate of a substantially C shape in cross section, is welded to the exhaust pipe 30 and then a substantially straight, headed pin 34 is welded to the upper end of the hanger bracket 33. However, in the case that the hooked portion 32 or the hanger bracket 33 is welded to the exhaust pipe 30, the thinner thickness of the exhaust pipe 30 greatly increases the difficulty of welding work of the hooked portion or the hanger bracket to the exhaust pipe. Also, there is a tendency of stress concentration which may be induced in the vicinity of weld bead. Such stress concentration may degrade the durability of the exhaust-system support device.

SUMMARY OF THE INVENTION

Accordingly, it is an object of the invention to provide an exhaust-system support structure which avoids the aforementioned disadvantages of the prior art.

It is another object of the invention to provide an improved exhaust-system support structure which is capable of providing a high durability and enhancing the supporting-rigidity in various directions of the exhaust pipe, while preventing undesired stress concentration and minimizing the number of component parts of the exhaust-system support device.

In order to accomplish the aforementioned and other objects of the present invention, an exhaust-system support structure comprises a mounting arm adapted to be engaged with an elastic support member, and a support bracket having a tubular-member holding portion adapted to be tightly holding an exhaust-system tubular member, and a mounting-arm holding portion adapted to be tightly holding the mounting arm, wherein the mounting arm has a flatted portion being formed with an abutted portion which abuts the exhaust-system tubular member, wherein the mounting-arm holding portion has a cross section that an inner peripheral wall of the mounting-arm holding portion is contoured to be fitted to an outer periphery of the flatted portion to hold the flatted portion, and wherein the mounting arm is fixedly connected to the exhaust-system tubular member by pressing a bottom face of the abutted portion against an outer periphery of the exhaust-system tubular member. Preferably, the abutted portion has, all over its entire length, a bottom face which lies flush with an axially-extending straight line of the outer periphery of the exhaust-system tubular member. It is preferable that the flatted portion has at least one flat side wall and a ridged portion, and the ridged portion is formed with a projected portion and the mounting-arm holding portion is formed with a recessed portion into which the projected portion is fitted tightly. The abutted portion may be formed with an additional projected portion on the bottom face facing apart from the ridged portion and an additional recessed portion may be formed in the outer periphery of the exhaust-system tubular member so that the additional projected portion is tightly fitted to the associated recessed portion. More preferably, the tubular-member holding portion may be formed with an inwardly embossed portion, and the exhaust-system tubular member may be formed with a recessed portion in which the inwardly embossed portion is received. The tubular-member holding portion of the support bracket may be formed with two opposing flanged portions which are separable from each other through a disjoined section and abuttable with each other through the disjoined section, so that the support bracket tightly holds the exhaust-system tubular member by spot-welding one of the two opposing flanged portions to the other.

DESCRIPTION OF THE PREFERRED EMBODIMENTS

Figure 1:
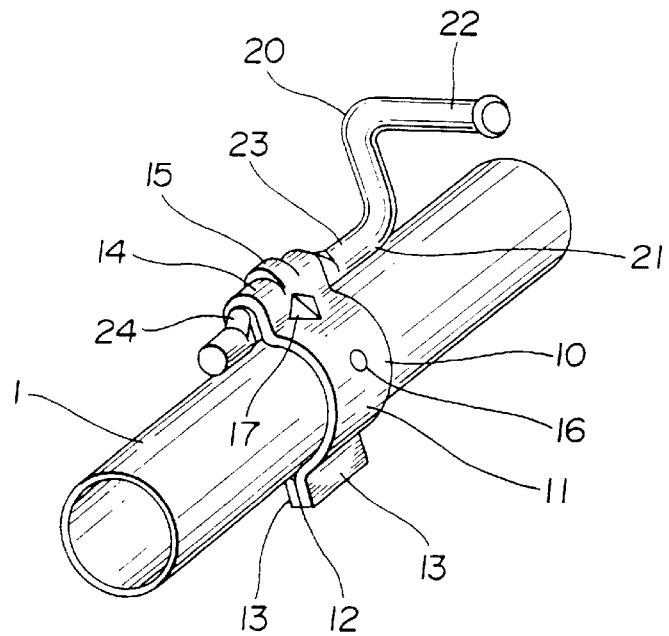
FIG. 1 is a perspective view illustrating an exhaust-system support structure of one embodiment according to the invention.
Figure 2:
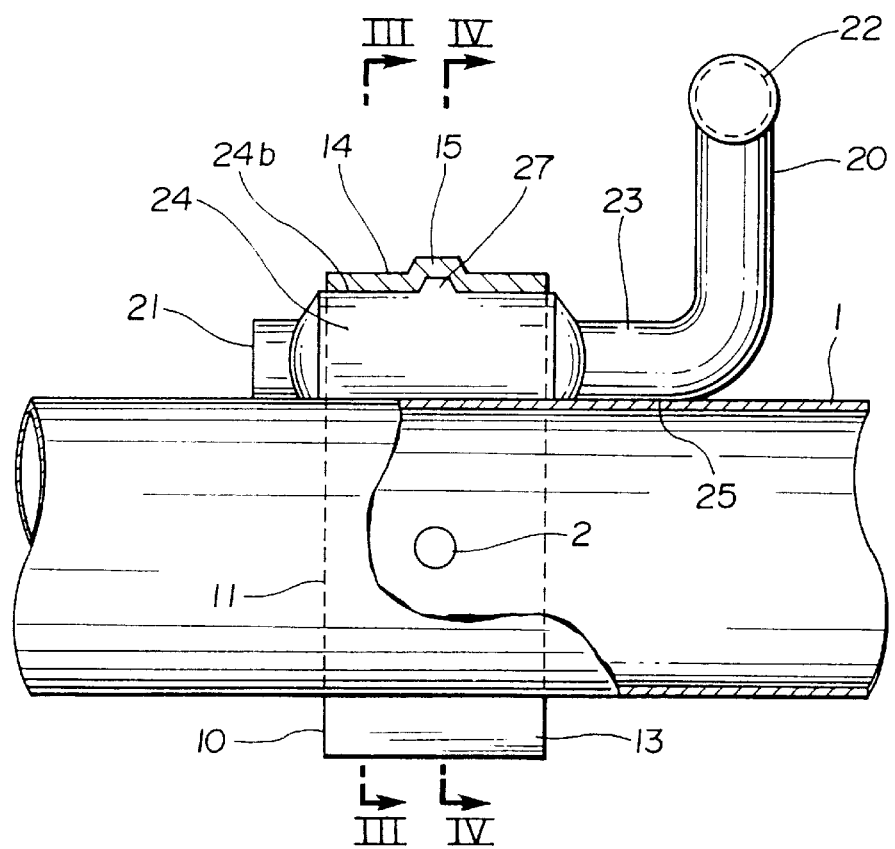
FIG. 2 is a cross-section of the exhaust-system support device of the embodiment shown in FIG. 1, taken in the longitudinal direction of the exhaust pipe.
Figure 3:
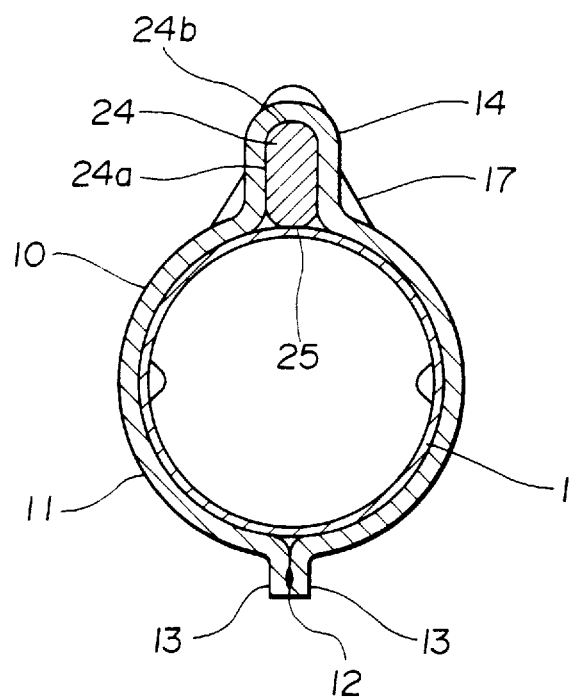
FIG. 3 is a lateral cross-sectional view taken along the line A—A of FIG. 2.
Figure 4:
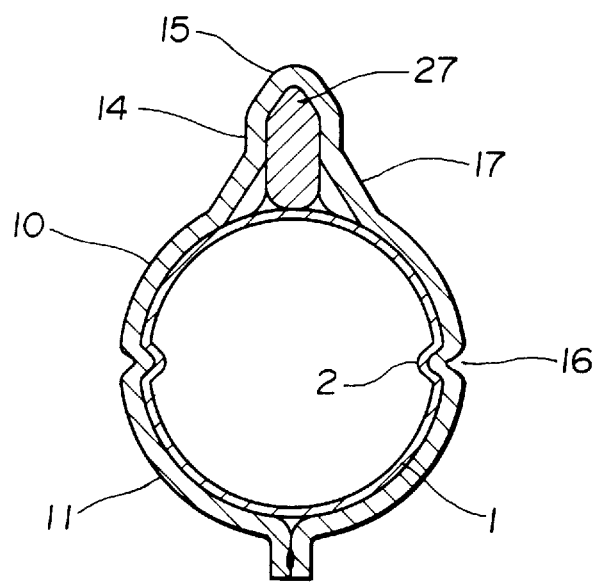
FIG. 4 is a lateral cross-sectional view taken along the line B—B of FIG. 2.
Figure 5:
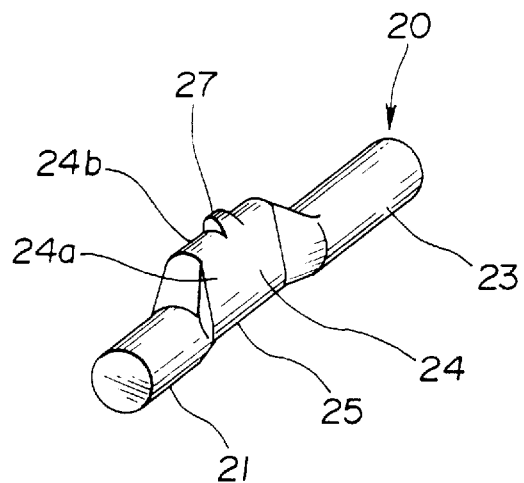
FIG. 5 is a perspective view illustrating an exhaust-pipe abutted portion constructing a part of the exhaust-pipe mounting portion of the embodiment.

Referring now to the drawings, particularly to FIGS. 1, 2, 3 and 4, there is shown the exhaust-system support structure or support device of the embodiment. As best seen in FIG. 1, the exhaust-system support device of the embodiment is constructed by only two parts, namely an exhaust-system support bracket denoted by 10 and an exhaust-system mounting arm denoted by 20, and is exemplified in case of an exhaust-pipe support bracket. The support bracket 10 is composed of an exhaust-pipe clamping portion (or the exhaust-system tubular-member holding portion) 11 and an exhaust-pipe mounting-arm clamping portion (or the exhaust-system mounting-arm holding portion) 14, both being formed integral with each other. The support bracket 10 is substantially cylindrical in cross section. The exhaust-pipe clamping portion 11 is formed so that the inner peripheral curved surface is contoured to be fit to the outer periphery of the exhaust pipe 1. The exhaust-pipe clamping portion 11 has a pair of two opposing flanged portions (13, 13) which are separable from each other through a disjoined or joined section 12. When mounting the support bracket 10 on the exhaust pipe 1, the support bracket 10 is integrally connected to the exhaust pipe 1 by spot-welding the two opposing flanged ends (13, 13) to each other, while tightly clamping the outer periphery of the exhaust pipe 1 by the exhaust-pipe clamping portion 11 and simultaneously clamping and pushing the abutted portion 21 of the exhaust-pipe mounting arm 20 on the outer periphery of the exhaust pipe by the exhaust-pipe mounting-arm clamping portion 14. As seen in FIG. 1, the previously-noted exhaust-pipe mounting arm 20 is made of a metallic solid round bar (a rod-like member) by way of two-step bending. The mounting arm 20 is comprised of the exhaust-pipe abutted portion (or the exhaust-system tubular-member abutted portion) 21 with an axially straight-extending, laterally-curved bottom face 25 (see FIG. 5), and a laterally-extending, essentially right-angled hanged portion 22. The inner peripheral surface of the exhaust-pipe mounting-arm clamping portion 14 is contoured to be fitted to the outer periphery of the press-worked, flatted portion 24 (as will be fully described later) of the exhaust-pipe mounting arm 20, so that the exhaust-pipe mounting arm 20 is tightly fitted to the exhaust pipe 1 by adequately pressing the abutted portion 21 against the outer peripheral wall of the exhaust pipe 1. As best shown in FIG. 5, the exhaust-pipe abutted portion 21 of the mounting arm 20 is formed with the flatted portion 24 by way of press-working in the middle of the round bar portion 23. The lower end face of the flatted portion 24 is designed to be the same level as the lowermost end face of the outer periphery of the round bar portion 23 and forming a portion of the bottom face 25 of the exhaust-pipe abutted portion 21. Thus, the lowermost end face of the round bar portion 23 and the lower end face of the flatted portion 24 are arranged with each other in an axial straight line on the outer periphery of the exhaust pipe 1. The upper end face of the flatted portion 24 is designed to be raised from the uppermost end face of the outer periphery of the round bar portion 23 to form a ridged portion 24b. As clearly seen in FIG. 6, the exhaust-pipe mounting-arm clamping portion 14 of the support bracket 10 has a width W essentially equivalent to the axial length S of the flatted portion 24 of the exhaust-pipe mounting armed portion 20. In addition, the inner peripheral wall surface of the exhaust-pipe mounting-arm clamping portion 14 is suitably fitted to and contoured to be identical to two side walls 24a and the ridged portion 24b of the flatted portion 24, in lateral cross-section. When integrally connecting the support bracket 10 to the exhaust pipe 1, the exhaust-pipe mounting armed portion 20 is first put on the outer periphery of the exhaust pipe 1 by abutting the bottom face 25 of the exhaust-pipe abutted portion 21 on the upper end of the exhaust pipe 1. The support bracket 10 serves to hold the flatted portion 24 in the exhaust-pipe mounting-arm clamping portion 14 and to evenly adequately push or press the bottom face 25 of the abutted portion 21 against the outer periphery of the exhaust pipe, in order to fix the exhaust-pipe mounting armed portion 20 to the exhaust pipe 1. The flatted portion 24 is also formed with an outwardly projected portion 27 further projected from the upper face of the ridged portion 24b, whereas the exhaust-pipe mounting-arm clamping portion 14 is also formed integral with an outwardly-projected-portion receiving recessed portion 15 whose inner periphery is contoured to be equivalent to the outline of the projected portion 27. The exhaust-pipe clamping portion 11 is formed integral with an inwardly embossed portion 16 substantially midway between the exhaust-pipe mounting-arm clamping portion 14 and the two opposing flanged portions (13, 13). On the other hand, a recessed portion 2 is formed in the exhaust pipe 1 so that the recessed portion 2 is accurately fitted onto the embossed portion 16. A beaded portion 17 is further formed essentially at a center of the boundary between the exhaust-pipe clamping portion 11 and the exhaust-pipe mounting-arm clamping portion 14.

With the previously-noted arrangement, the support bracket 10 is fixedly connected to the exhaust pipe 1 by integrally connecting the two opposing flanged portions (13, 13) to each other by way of spot-welding and thus tightening the exhaust-pipe clamping portion 11, and by engagement between the embossed portion 16 and the recessed portion 2. Also, the exhaust-pipe mounting arm 20 is fixedly connected to both the support bracket 10 and the exhaust pipe 1 by firmly holding the flatted portion 24 of the exhaust-pipe abutted portion 21 by the exhaust-pipe mounting-arm clamping portion 14. In a conventional manner, the exhaust-pipe mounting armed portion 20, integrally connected to the exhaust pipe 1, is elastically suspended on the car body by hanging the hanged portion 22 against an elastic support hanger assembly usually employing a rubber hanger section.

As discussed above, according to the exhaust-system support structure of the embodiment, the exhaust-pipe mounting arm 20, made of a metallic solid rod material, is formed with both the press-worked flatted portion 24 and the axially straight bottom face 25 extending parallel to the axial direction of the exhaust pipe 1. Additionally, the exhaust-pipe mounting arm 20 is fixedly connected to the exhaust pipe 1 in a manner so as to permanently push or press the former against the latter by firmly tightening or clamping the support bracket 10 (having the exhaust-pipe mounting-arm clamping portion 14 of the cross section essentially identical to the outline of the side walls 24a and the ridged portion 24b) to the exhaust pipe 1. In the shown embodiment, also provided in the press-worked, flatted portion 24 and the exhaust-pipe mounting-arm clamping portion 14 are the outwardly projected portion 27 and outwardly-projected-portion receiving recessed portion 15, and also provided in the exhaust-pipe clamping portion 11 and the exhaust pipe 1 are the embossed portion 16 and the recessed portion 2. As a consequence, there is no need for directly welding the exhaust-system support device to the exhaust pipe, thus eliminating the possibility of cracks or breakage resulting from stress concentration which may occur in the vicinity of weld bead. The vertical displacement of the exhaust-pipe mounting arm 20 to the exhaust pipe 1 can be effectively suppressed, since the exhaust-pipe abutted portion 21 is permanently pressed on the exhaust pipe through the clamping portion 14. Bottom end faces of the round bar portion 23 and the flatted portion 24 are axially aligned with each other and lie flush with the axially-extending straight peak line of the outer periphery of the exhaust pipe 1, and thus, under the clamped state of the exhaust-pipe mounting arm 20 on the exhaust pipe 1, the bearing pressure between the abutted portion 21 and the outer peripheral surface of the exhaust pipe 1 is effectively dispersed or distributed on the axially-straight extending abutted section. Accordingly, a reaction force which results when a force is exerted on the outer peripheral surface of the exhaust pipe 1 from the bottom end face of the abutted portion 21, can be effectively reduced, and thus there is less possibility of breakage of the peripheral wall surface of the exhaust pipe after clamping the support bracket 10 on the exhaust pipe 1. Undesired rotational motion of the exhaust-pipe clamping arm 20 about an axis parallel to the axial line of the exhaust pipe 1 can be prevented, since the flatted portion 24 is firmly fitted to the inner periphery of the mounting-arm clamping portion 14 by way of the clamping action. The fitting action between the flatted portion 24 and the mounting-arm clamping portion 14 effectively prevents a yawing motion of the mounting arm 20 to the exhaust pipe 1. Also, the fitting action between the flatted portion 24 and the clamping portion 14 and the pressing action between the abutted portion 21 and the outer periphery of the exhaust pipe 1, can effectively prevent the longitudinal displacement of the mounting arm 20 to the exhaust pipe 1 and other displacements and rotational motions in various directions. In addition to the above, the beaded portion 17, being essentially at a center of the boundary between the exhaust-pipe clamping portion 11 and the exhaust-pipe mounting-arm clamping portion 14, contributes to enhancement of rigidity of the support bracket 10, particularly the mounting-arm clamping portion 14. Thus, in the event that the exhaust-pipe mounting arm 20 rotates or moves relative to the exhaust pipe with yawing motion, there is less possibility that the gap between the inner peripheral side walls of the mounting-arm clamping portion 14 fitted to the respective side walls 24a of the flatted portion 24 will become wider than the specified gap equal to the distance between the two opposing side walls (24a, 24a). Furthermore, the number of component parts of the exhaust-system support structure are reduced to two parts, namely a support bracket 10 and an exhaust-pipe mounting arm 20, since the connection of the support bracket 10 to the exhaust pipe 1 is attained by spot-welding one flanged portion 13 of the exhaust-pipe clamping portion to the other 13. There is the merit of reduction of production costs and the decrease of manpower in control. Furthermore, the exhaust-system support device composed of the support bracket 10 and the exhaust-pipe mounting arm 20 can be easily assembled on the exhaust pipe 1 by way of spot-welding.

Figure 6:
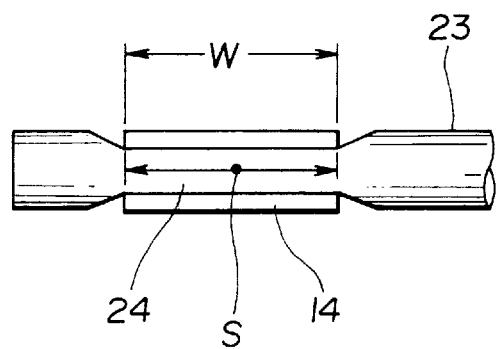
FIG. 6 is an illustration of the relationship between the exhaust-pipe mounting-arm clamping portion and the press-worked flatted portion of the exhaust-pipe mounting arm.
Figure 7:
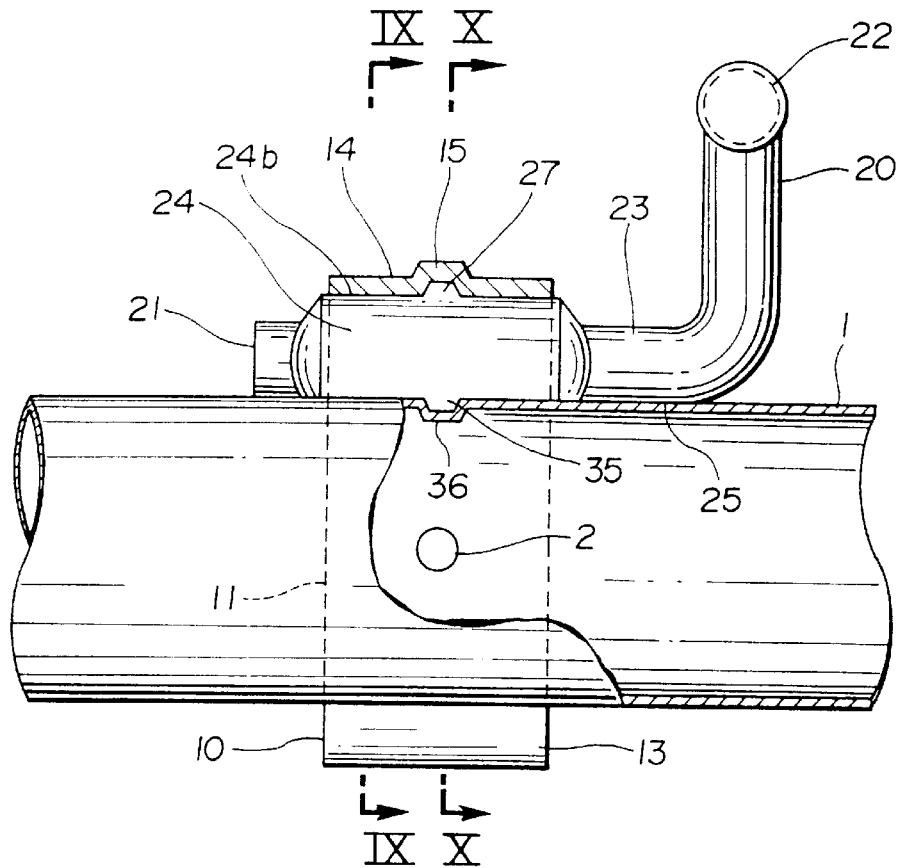
FIG. 7 is a cross-section of a modified exhaust-system support device, taken in the longitudinal direction of the exhaust pipe.
Figure 8:
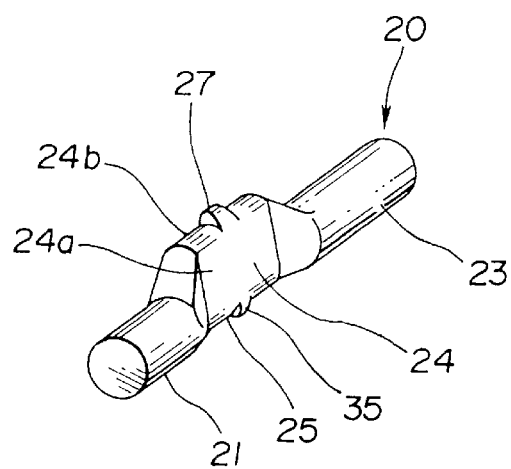
FIG. 8 is a perspective view illustrating an exhaust-pipe abutted portion constructing a part of the exhaust-pipe mounting portion of the modification.
Figure 9:
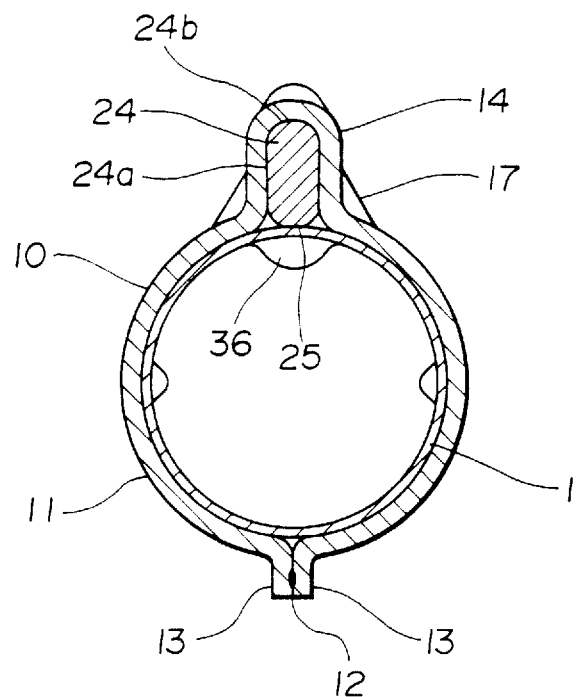
FIG. 9 is a lateral cross-sectional view taken along the line C—C of FIG. 7.
Figure 10:
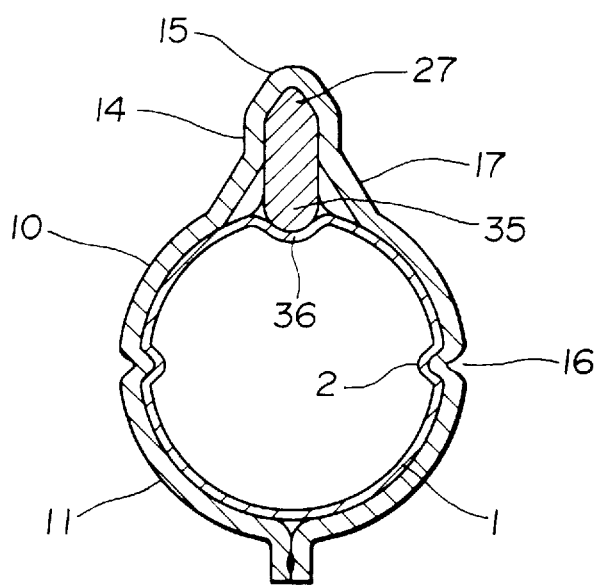
FIG. 10 is a lateral cross-sectional view taken along the line D—D of FIG. 7.
Figure 11A:
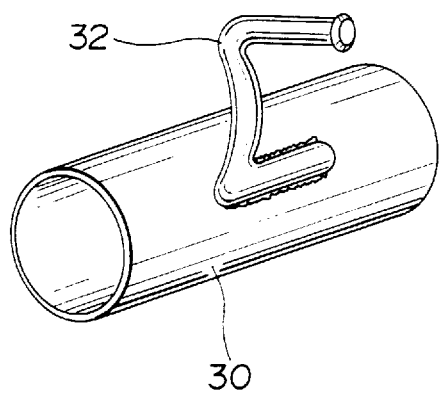
FIGS. 11A and 11B are perspective views illustrating two examples of the prior art exhaust-system support structure.
Figure 11B:
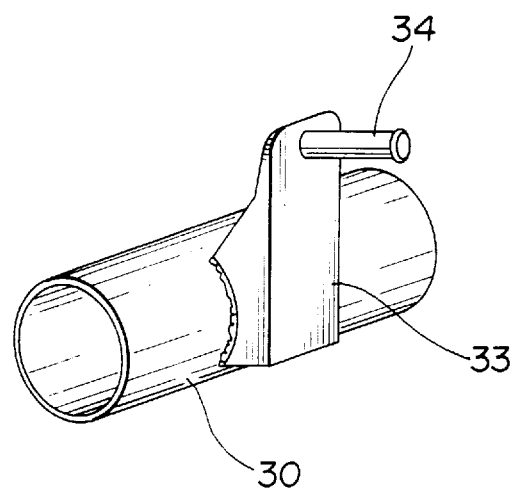

In the previously-discussed embodiment, the longitudinal displacement of the mounting armed portion 20 to the exhaust pipe is effectively prevented by virtue of engagement between the projected portion 27 of the ridged portion 24b of the flatted portion 24 and the outwardly-projected-portion receiving recessed portion 15 of the exhaust-pipe mounting-arm clamping portion 14. In lieu thereof, as seen in FIG. 6, it will be appreciated that relative motion of the exhaust-pipe mounting arm 20 with respect to the mounting-arm clamping portion 14 can be effectively prevented by means of the larger-diameter round bar portions 23 integrally formed at both ends of the flatted portion 24, if the dimensional difference (S–W) between the axial length S of the flatted portion 24 and the width W of the amounting arm clamping portion 14 is very little. In this case, the exhaust-system support device does not require the formation of both the projected portion 27 and the recessed portion 15. Alternatively, in order to effectively and certainly prevent the relative motion among the support bracket 10, the mounting arm 20 and the exhaust pipe 1 and to securely hold the mounting arm 20 in place, as shown in FIGS. 7 through 10, preferably, an additional projected portion 35 may be formed on the bottom face facing apart from the ridged portion 24b of the flatted portion 24, while the associated projected-portion receiving recessed portion 36 may be formed in the outer periphery of the exhaust pipe 1. The two engaging pairs (27,15; 35,36) can provide a superior effect enough to prevent the relative motion among the three members 1, 10 and 20, and thus the formation of the other engaging pair (i. e., the embossed portion 16 and the recessed portion 2) can be eliminated in case of the modification shown in FIGS. 7 to 10.

In the shown embodiment, although the mounting arm 20 is formed integral with the two flat side walls (24a, 24a) by way of press-working so that the side walls (24a, 24a) both extend vertically, in lieu thereof these side walls may be replaced with two parallel upper and lower flat faces which are formed on the mounting arm 20 so that the upper and lower flat faces extend horizontally and parallel to the central axis of the exhaust pipe. In this case, the cross section of the mounting-arm clamping portion 14 must be designed so that the inner peripheral wall surface of the mounting-arm clamping portion 14 is contoured to be fit to the outer periphery of the flatted portion 24 including the above-mentioned horizontally-extending two flat faces.

Moreover, in the preferred embodiment, although the support bracket 10 is integrally connected to the exhaust pipe 1 by spot-welding, it will be appreciated that the two flanged portions of the support bracket are securely connected to each other by way of riveting or caulking. Alternatively, in the event that bolts and nuts are used as fastening means in the same manner as the prior art device and thus the bolts and nuts can be somewhat loosened owing to vibrations, in case of the embodied exhaust-system support device, the support bracket 10 never moves relative to the exhaust pipe, since the embossed portion 16 and the corresponding recessed portion 2 are firmly engaged with each other and cooperative with each other to prevent the relative motion of the support bracket to the exhaust pipe.

In the shown embodiment, although the exhaust-system support device or structure of the invention is adapted to be connected to an exhaust pipe, the support device may be adapted to be connected to another component parts included in the exhaust system, such as a catalytic converter, a sub-muffler, a main muffler or the like.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An exhaust-system support structure comprising:

a rod-like mounting arm having a hanging portion adapted to be engaged with an elastic support member and having a round bar portion adapted to be fitted onto an outer periphery of an exhaust-system tubular member; and a support bracket having a tubular-member holding portion adapted to tightly hold the exhaust-system tubular member, and a mounting-arm holding portion adapted to tightly hold the mounting arm, said mounting-arm holding portion integrally formed with the tubular-member holding portion;

said mounting arm having a rod-like abutment portion which is adapted to abut against said exhaust-system tubular member and which comprises a flattened portion formed by press-working substantially at the middle of said round bar portion, said flattened portion having at least one flat side wall, a ridged portion raised upwardly from the outer periphery of said round bar portion, and an axially-extending laterally-curved bottom face, said mounting-arm holding portion having a cross section such that an inner peripheral wall of said mounting-arm holding portion is contoured to be fitted to an outer periphery of said flattened portion to hold said flattened portion, and said mounting arm being fixedly connectable to said exhaust-system tubular member by pressing a bottom face of said rod-like abutment portion against the outer periphery of said exhaust-system tubular member.

2. An exhaust-system support structure as claimed in claim 1, wherein said rod-like abutment portion has, over its entire length, a bottom face which, in use, lies flush with an axially-extending straight line of the outer periphery of said exhaust-system tubular member, and which is flush with the bottom of the outer periphery of said round bar portion.

3. An exhaust-system support structure as claimed in claim 2, wherein the ridged portion of said flattened portion comprises a projected portion which fits tightly into a recessed portion of said mounting-arm holding portion.

4. An exhaust-system support structure as claimed in claim 3, wherein said abutment portion is formed with an additional projected portion on its bottom face facing away from the ridged portion, for tight fitting in a recessed portion in the outer periphery of said exhaust-system tubular member.

5. An exhaust-system support structure as claimed in claim 3, wherein said tubular-member holding portion is formed with an inwardly embossed portion adapted to be received in a recessed portion of said exhaust-system tubular member.

6. An exhaust-system support structure as claimed in claim 1, wherein said tubular-member holding portion of said support bracket has two opposing flanged portions which are separable from each other and abuttable with each other and are spot-weldable to enable said support bracket to tightly hold said exhaust-system tubular member.

* * * * *